July 24, 1934.  H. THÜRLINGS  1,967,565
MACHINE FOR THE PRODUCTION OF BONBONS
Filed Sept. 9, 1932  4 Sheets-Sheet 1
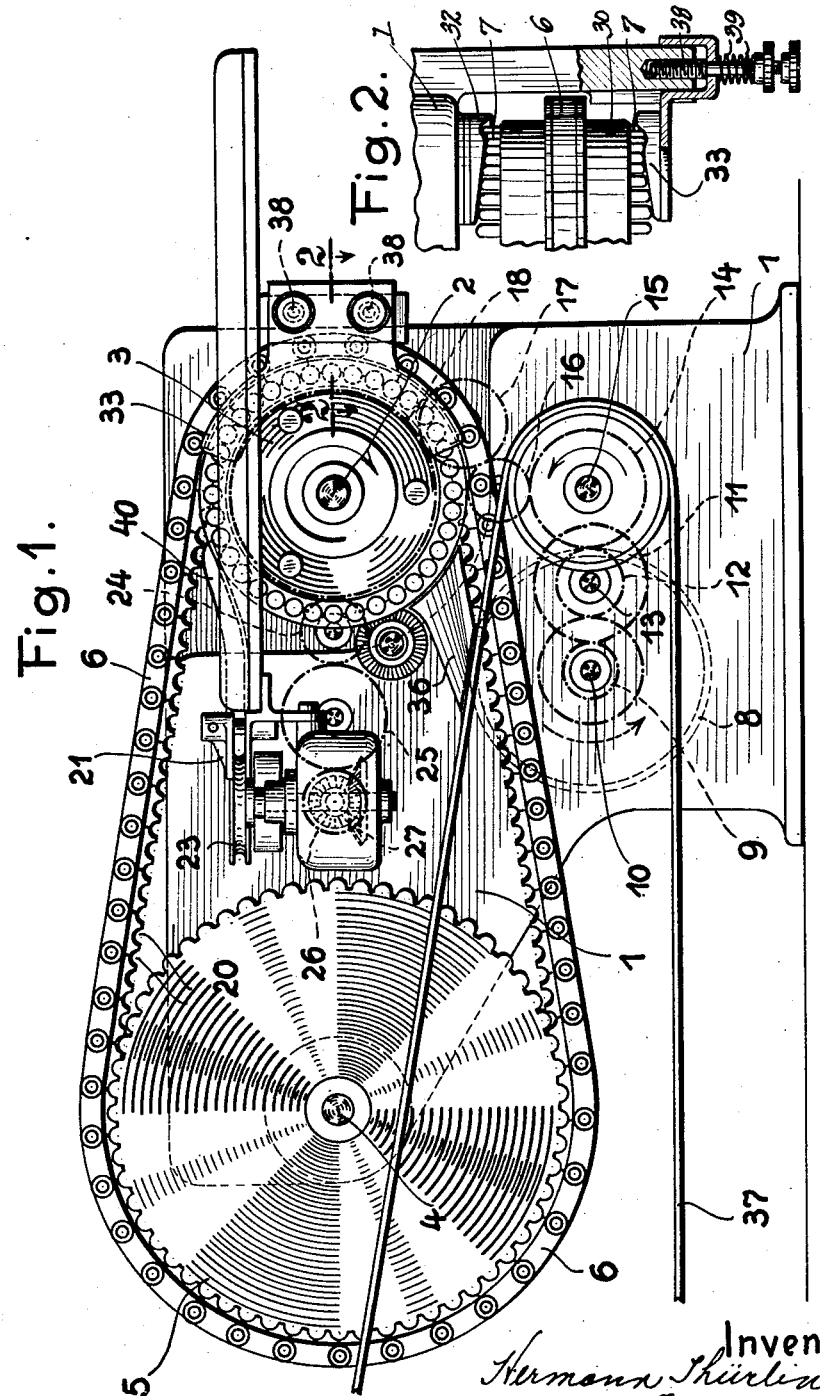
Inventor:
Hermann Thürlings
By (signature)
Attorney July 24, 1934.     H. THÜRLINGS     1,967,565
MACHINE FOR THE PRODUCTION OF BONBONS
Filed Sept. 9, 1932     4 Sheets-Sheet 2
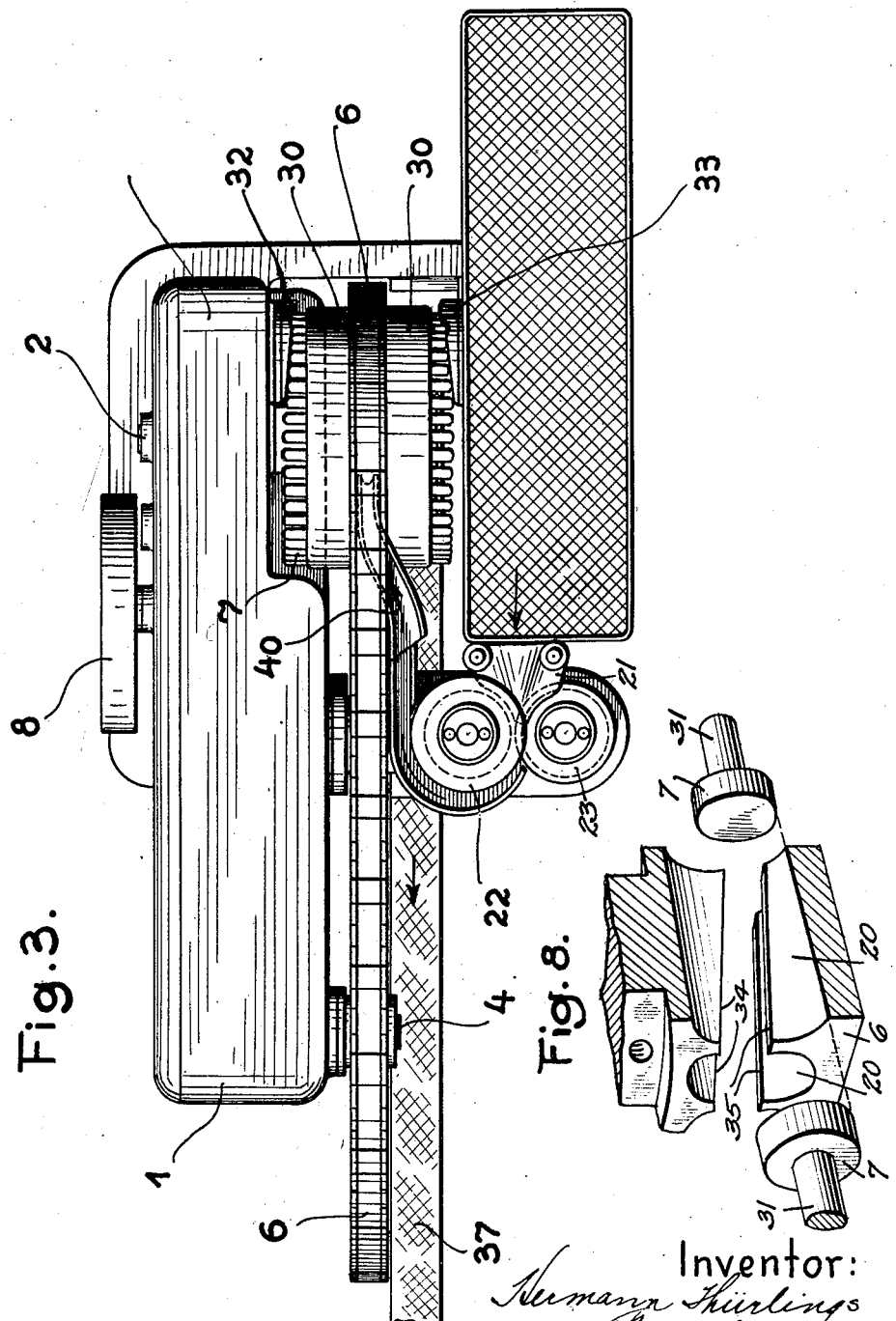

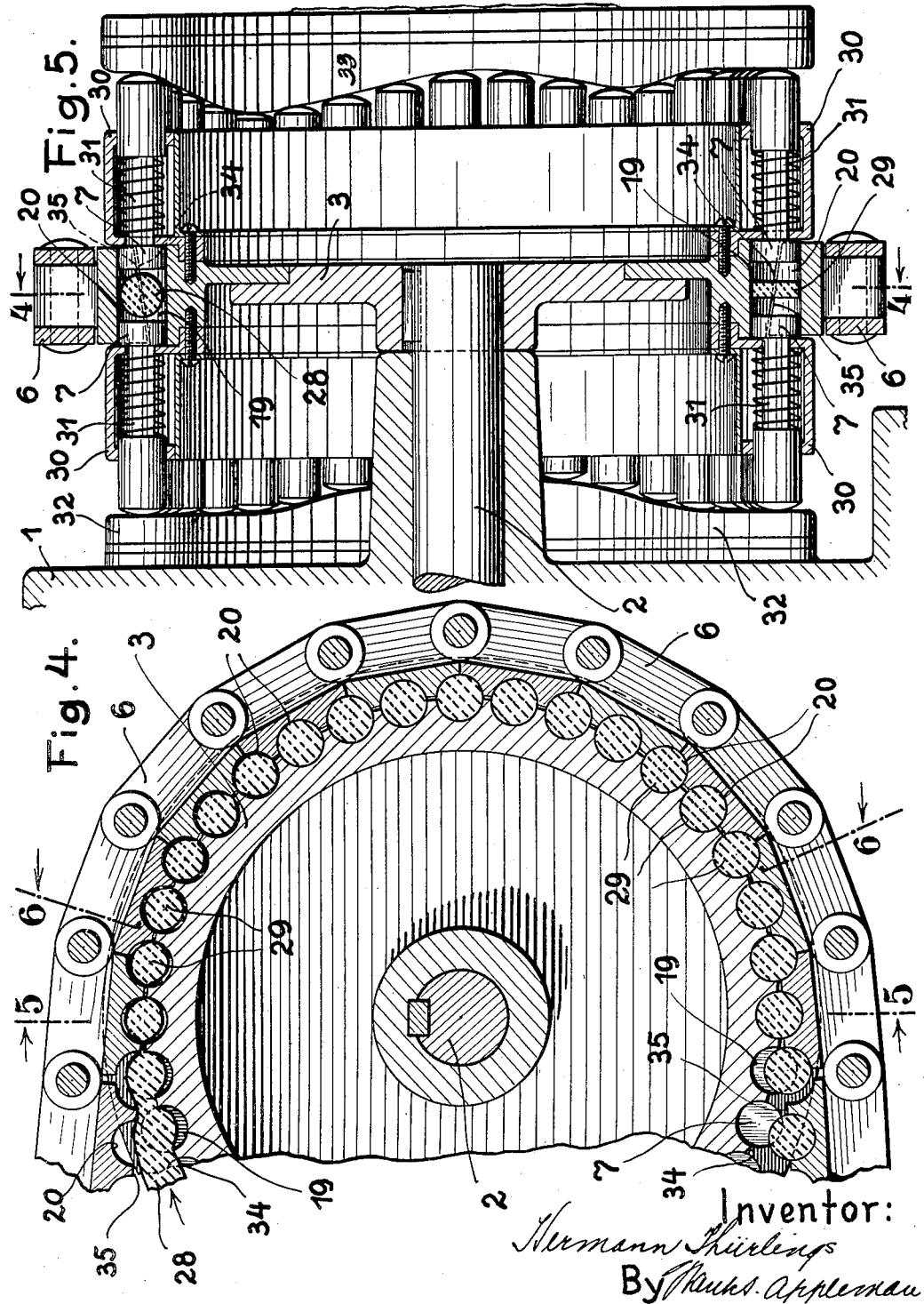

Patented July 24, 1934

1,967,565

UNITED STATES PATENT OFFICE 1,967,565

MACHINE FOR THE PRODUCTION OF BONBONS

Hermann Thürlings, Viersen, Germany, assignor to Hansella G. m. b. H., Viersen, Germany, a firm composed of Albert Henkelsen and Otto Pongs Application September 9, 1932, Serial No. 632,449
In Germany September 12, 1931

5 Claims. (Cl. 107—15)

With known machines for stamping bonbons, separate pieces are squeezed off from the plastic mass of sweetmeat, which is supplied in rope-form to the machine, by bars, flaps, rotary bodies and the like which are provided with shaped recesses and these pieces are stamped into bonbons by the aid of pairs of stamps displaceably mounted between the shaped recesses that is, in the two-part mould chambers. This method has the disadvantage that the bonbons show burrs at the points where the sweetmeat mass is squeezed off which are unsightly and inconvenient in packing. This disadvantage is overcome by the improved apparatus in that the stamps of each pair, after reaching the positions in which they are closest to each other, are moved as a whole with the stamped bonbon which is located between them several times backwards and forwards inside the mould chambers, the cutting edges of the co-operating mould halves being obliquely inclined to the direction of movement of the stamps in order to facilitate the cutting off of the bonbons. Further features and advantages of this invention will become apparent from the following description of a machine fitted with moulding and stamping devices according to the invention, it being shown by way of example in the accompanying drawings, in which:—

Figure 6:
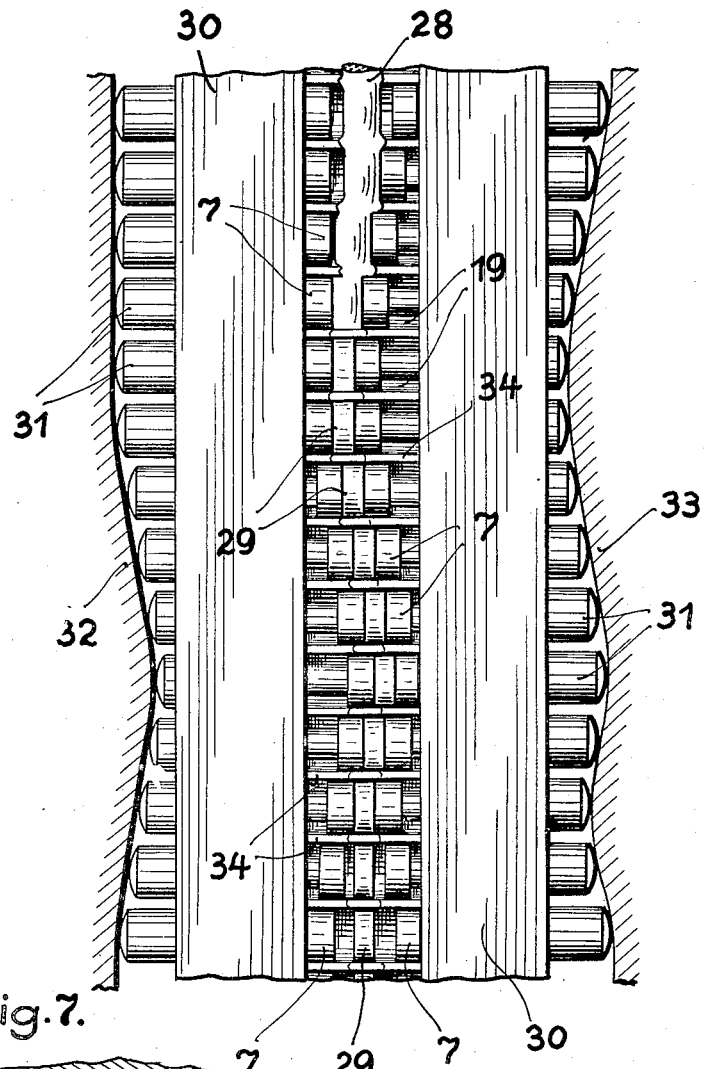
Figure 7:
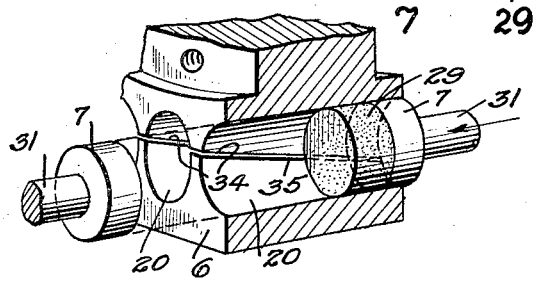

Fig. 1 is a side elevation of the machine,

Fig. 2 is a fragmentary plan view, partially in section on the line 2—2 of Fig. 1, Fig. 3 is a plan view of the machine, Fig. 4 is a vertical section through the stamping mould chain and stamping mould drum, Fig. 5 is a section on the line 5—5 of Fig. 4, Fig. 6 is a section on the line 6—6 of Fig. 4 shown developed, Fig. 7 is a perspective view of the mold sections assembled and parts associated therewith, and Figure 8 is a similar view with the parts disconnected.

The machine, which is of known general construction, has a hollow pedestal 1 on which are rotatably mounted the shaft 2 of the mould drum 3 and the shaft 4 of the chain wheel 5, over which runs the mould carrier chain. This latter runs over the mould drum and is carried along by the cylindrical stamps 7 penetrating into the moulds. The drive of the drum 3 is effected in known manner by means of a belt pulley 8 and a pinion 9 on the shaft 10 which pinion engages the gear wheel 11, which is secured on the shaft 13 together with a pinion 12. The pinion 12 meshes with a gear wheel 14 on the shaft 15 and the gear wheel 14 drives through gearing 16, 17 the toothed wheel 18 mounted on the shaft 2 carrying the drum 3. On the circumference of the drum 3 are formed at regular intervals, according to the shape of the bonbons to be made, semi-cylindrical or semi-prismatic recesses 19, with which similar recesses 20 in the mould plates of the chain 6 cooperate to form hollow cylinders or hollow prisms constituting the mould chambers for the bonbons to be made.

The sweetmeat rope which is fed to these moulding chambers is formed in known manner by the pushing of a plastic sugary mass into the hopper 21 from which the mass is drawn by grooved rollers 22, 23 which impart a circular section thereto, the mass entering between the chain and drum through a guide 24 as a round rope 28. The roller 23 is driven from the shaft 2 of the mould drum through the gear wheel 18, gear wheels 24, 25, 26, and the pair of bevel wheels 27.

On the coming together of the mould halves 19, 20 (Fig. 4), pieces 29 are cut off from the rope 28 and pass on in the moulding chambers. In these are fitted stamps 7 which are guided in apertures in two rings 30 fixed on the sides of the drum 3, they being guided co-axially with the hollow semicylinders 19 and forced outwardly by springs 31 on to the front surfaces of guide strips 32, 33 (Figs. 2 and 5) which are fixed on the pedestal 1 and form rings concentric to the shaft 2. These front surfaces are so formed (Fig. 6) that, after the complete closing together of the half moulds 19, 20, the stamps on one side thereof are continuously pressed more inwardly, during the further rotation of the drum 3, until the mould lying between is completely filled, whereby at the same time the thin strip of sugary mass remaining in the gap between the mould halves is sheared off. During a still further rotation of the drum, the distance apart of the stamps is maintained constant, but they, together with the bonbon pressed between them, are moved backwards and forwards axially of the hollow mould due to the shape of the guide strips 32, 33, whereby the surface of the bonbon in contact with the hollow mould is smoothed. This smoothing is still further increased by the arrangement of the edges 34, 35 of the mould halves at an inclination to the axis of the hollow mould.

When the mould halves move apart the completed bonbons are conveyed in known manner by means of a stripper 36 on to a conveyor band 37 which is driven from the shaft 15.

In order to prevent excessive compression of the bonbons by the stamps 7, one guide strip 33 is fixed on the pedestal 1 by screws 38 and springs 39 so as to be displaceable in the direction of movement of the stamps, the springs yielding when an excessive pressure of the stamps is produced.

It is evident that the invention may also be applied to machines for producing bonbons of which the construction differs considerably from that of the machine described, and such machines are therefore to be considered as being within the scope of the invention.

I claim:—

1. A machine for forming candy pieces from a rope of plastic sweetmeat by means of stamping tools movably arranged in moulding chambers, wherein the moulding-chamber-halves are mounted behind one another on movable links which in continuous motion unite to form closed moulding chambers while severing the candy pieces from the rope and which after that again become separated from one another, characterized in that the meeting edges of the moulding-chamber-halves are disposed obliquely of the working direction of the stamping dies and in that there have been provided means for forward and backward movement of the stamping die-pairs in their stamping position together with the stamped candy pieces within the moulding chambers and in transverse direction to the movement of the latter.

2. A machine as per claim 1 characterized in that the means for the forward and backward movement of the stamping dies consist of laterally arranged guide bars, against which the dies are pressed by springs and which are provided with such projections or recesses that the dies will first stamp the candy pieces, whereupon the dies and the candy pieces are jointly moved forward and backward, whereby the burr on both sides of the candy pieces resulting from the cutting action is smoothed over at the obliquely disposed meeting edges of the moulding chambers.

3. In a machine of the kind described, a pair of cooperating moulding dies having meeting edges in a plane oblique to the axis of the dies, means for moving said dies into and out of moulding position, said dies when closed forming an open ended moulding chamber, a pair of opposed plungers fitting said moulding chamber, and means to move said plungers primarily in opposite directions toward each other and to reciprocate said plungers longitudinally in the mould simultaneously in the same direction.

4. In a machine of the kind described, a pair of cooperating moulding dies having meeting edges in a plane oblique to the axis of the dies, means for moving said dies into and out of moulding position, said dies when closed forming an open ended moulding chamber, a pair of opposed plungers fitting said moulding chamber, and a pair of cam devices engaging said plungers to operate the same, said cam devices having opposed sinuous portions acting to move the plungers toward each other, parallel sinuous portions into which the opposed portions merge, said parallel sinuous portions effecting simultaneous movement of the plungers in the same direction, and other opposed sinuous portions into which the parallel portions merge, said last opposed portions permitting movement of the plungers away from each other.

5. In a machine of the kind described, a pair of cooperating moulding dies having meeting edges in a plane oblique to the axis of the dies, means for moving said dies into and out of moulding position, said dies when close forming a open ended moulding chamber, a pair of opposed plungers fitting said moulding chamber, a revolving mould drum supporting said mould and its plungers to travel in a fixed path, a pair of endless cams each supported opposite the path of the mould at a respective side thereof, said cams being engaged by said plungers respectively and being arranged to primarily move said plungers in opposite directions toward each other, secondarily to reciprocate the plungers in the same directions in the mould and then to move the plungers apart in opposite directions.

HERMANN THÜRLINGS.